No. 723,425. PATENTED MAR. 24, 1903.
T. E. THOMPSON.
EDUCATIONAL APPLIANCE.
APPLICATION FILED AUG. 15, 1902.
NO MODEL. 2 SHEETS—SHEET 1.
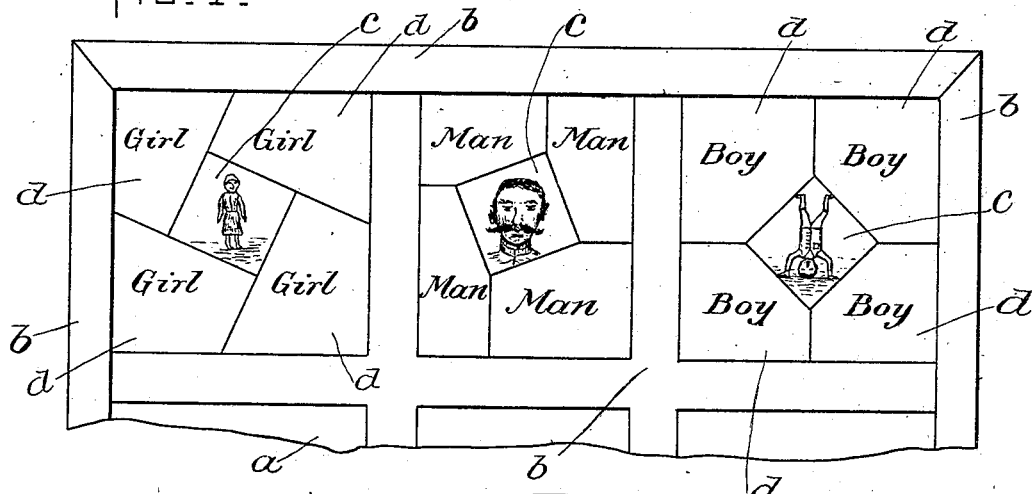
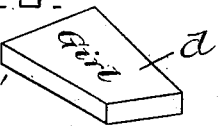
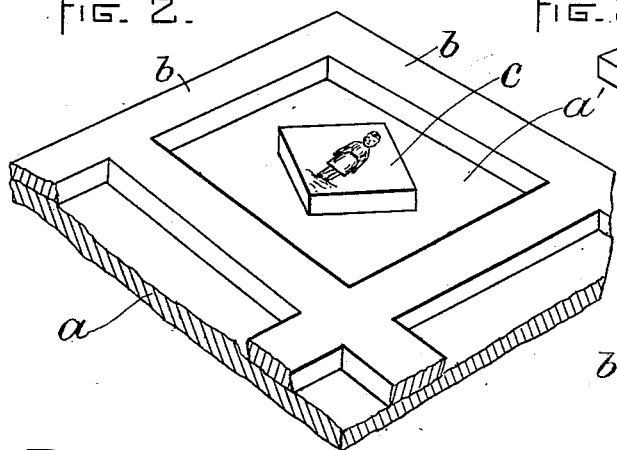
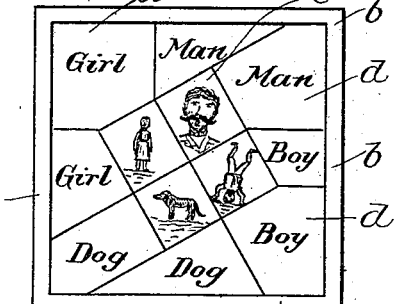
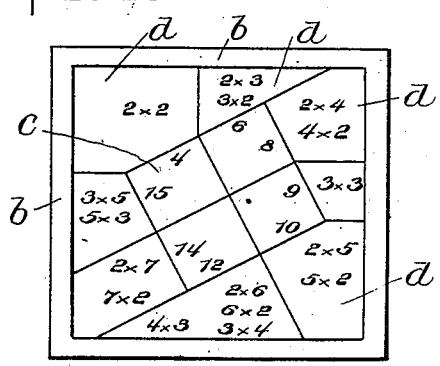
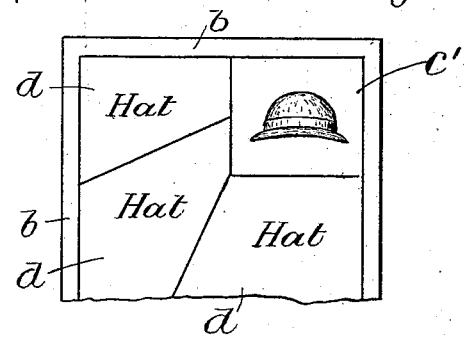
WITNESSES.
George Pezzetti
E. Batchelder
INVENTOR.
Thomas E. Thompson
by Wright Brown & Quinby
Attys.

No. 723,425. PATENTED MAR. 24, 1903.
T. E. THOMPSON.
EDUCATIONAL APPLIANCE.
APPLICATION FILED AUG. 15, 1902.
NO MODEL. 2 SHEETS—SHEET 2.

WITNESSES
George Pyythe
E Batchelder

INVENTOR.
Thomas E. Thompson
by Wright Brown & Quimby
Attys.

UNITED STATES PATENT OFFICE.

THOMAS E. THOMPSON, OF LEOMINSTER, MASSACHUSETTS.

EDUCATIONAL APPLIANCE.

SPECIFICATION forming part of Letters Patent No. 723,425, dated March 24, 1903.

Application filed August 15, 1902. Serial No. 119,758. (No model.)

*To all whom it may concern:*

Be it known that I, THOMAS E. THOMPSON, of Leominster, in the county of Worcester and State of Massachusetts, have invented certain new and useful Improvements in Educational Appliances, of which the following is a specification.

This invention relates to means for teaching the relation between printed words, symbols, or characters with which the mind of the learner is familiar and other expressions or embodiments of the same words, symbols, or characters.

The invention consists in an appliance constructed and arranged substantially as hereinafter described and claimed.

Of the accompanying drawings, forming a part of this specification, Figure 1 represents an appliance comprising a series of devices each embodying my invention. Fig. 2 represents a perspective view of one of the individual devices, showing a block-supporting field, an outer wall, and a fixed abutment, the movable blocks being removed. Fig. 3 represents in perspective one of the movable blocks, shown as of an irregular polygonal form. Figs. 4, 5, 6, 7, 8, and 9 represent modified forms of devices embodying the invention.

The same reference characters indicate the same parts in all the figures.

In the drawings, Figs. 1, 2, and 3 illustrate an embodiment of my invention in simple form, a series of the devices being shown in Fig. 1 as being placed for convenience upon a continuous board or table, which serves as a common base for several devices or groups.

Referring to Figs. 1, 2, 3, 4, and 5, $a$ represents the supporting-base, $b\ b$ fixed outer walls, and $c$ a fixed section or abutment surrounded by the walls $b$ and separated therefrom by a field $a'$ of irregular shape, the field surrounding the abutment $c$. $d\ d$ represent a series of movable blocks of irregular shape adapted to collectively cover the field $a'$. In this embodiment of my invention the abutment $c$ bears an expression or embodiment, in this case a picture, of some familiar object, as a boy or girl, dog or cat. The movable blocks $d$ are so formed that when each is placed in its proper position with relation to the fixed center section and outer walls the space will be completely filled. Each of these blocks is shown as bearing a word expressing the name or designation of the object shown in the picture. For instance, the abutment $c$, bearing the picture of a girl, is surrounded by a series of blocks $d$, bearing the word "Girl," and when properly arranged the words on all the blocks will appear in horizontal lines in correct position for reading from the same point from which the picture is viewed. This, as will be readily seen, furnishes a most useful and attractive means for teaching the form of printed words to the youngest pupils.

Fig. 4 illustrates a modification of the device shown in Fig. 1. In this figure the abutment $c$ is shown as bearing a plurality of pictures. Each picture occupies a definite portion of the center section and may or may not be separated from the portions bearing the other pictures by dividing-lines. Preferably a larger number of movable blocks $d$ are used than in the embodiment illustrated in Fig. 1, each of the blocks being, when properly placed, adjacent to only one of the divisions of the center section $c$ and bearing the verbal designation of the object illustrated in that division. The number of the movable blocks $d$ required to entirely fill the space is preferably made such that more than one will bear the name of each pictured object and will finally rest against the fixed wall or boundary and that portion of the abutment devoted to said object, thus adding somewhat to the difficulty of placing all the blocks in the correct position.

In Fig. 5 is illustrated an embodiment of my invention in which the ordinary Arabic numerals are used, combined in such manner as to assist in teaching simple mathematical operations. In the form here shown the abutment is represented in the center of the device and bears several numbers, each representing the result of a mathematical calculation which is indicated upon one of the movable blocks $d$, that block when properly placed being in a position adjacent to the division or portion of the abutment which bears the resulting number. As indicated, the expressions upon the blocks $d$ indicate the multiplication of one or more series of numbers, and the resulting number upon the center section is the product of the same. For instance, the fixed abutment may bear at one portion the character "8." The block $d$, which when properly placed will be adjacent to this portion of the abutment, will bear the expression "$2 \times 4$" or "$4 \times 2$," or both of them, the result of the multiplication in both these cases being, as indicated by the center character, "8." At another portion of the abutment the character "6" may appear, and the movable block which is intended to be placed next to it will bear the expression "$2 \times 3$" or "$3 \times 2$," or both of them. The expressions as here shown are those connected with the operation of multiplying, and the device, as illustrated in Fig. 4, is particularly designed for use in teaching the multiplication-table, a series of these devices proving of great assistance for this purpose. By suitably arranging the characters after the manner illustrated it is found that a series comprising eight groups will be sufficient to illustrate all the calculations required to embody the multiplication-table from "$1 \times 1$" to "$12 \times 12$." It is obvious that expressions may be similarly arranged on the blocks $d$, with suitable characters to indicate the operations of addition, subtraction, or division in place of multiplication, the numbers expressing the result of such operations being correspondingly arranged on the fixed abutment.

Fig. 6 represents a modification in which the central abutment surrounded by a block-receiving field is omitted and a fixed block $c'$ is substituted therefor, said block forming a part of the outer walls, its object being the same as that of the abutment $c$—namely, to give the block-receiving field an irregular shape.

Figure 7:
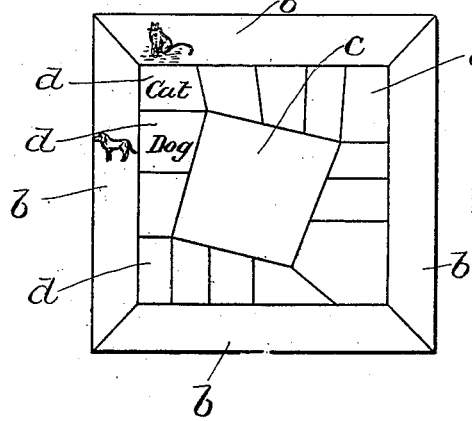
Fig. 7 shows parts of the outer walls made of considerable width and provided with the pictures, &c., the central abutment $c$ being left blank and the movable blocks placed between the outer wall and abutment.
Figure 8:
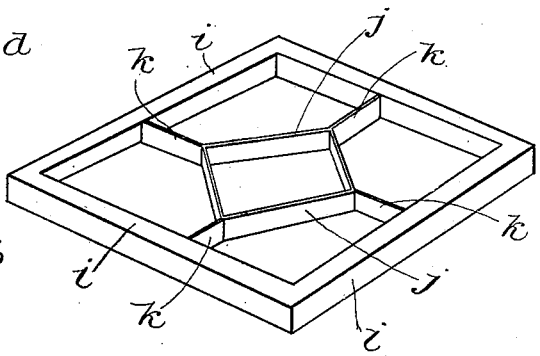

The invention may be embodied in an apparatus having no base, as shown in Fig. 8. In this figure $i$ is a marginal frame corresponding to the walls $b$. $j$ is an inner frame, and $k$ $k$ are strips connecting the frames $i$ and $j$. The said frames and strips form openings adapted to receive movable pieces corresponding to the abutments $c$ and blocks $d$. There is no base or bottom, this being supplied by placing the device on a table.

It is obvious that instead of placing the fixed characters on the fixed abutment $c$ or $c'$ or on a part or parts of the walls $b$ they may be displayed on the block-supporting field. Thus on the portion of the field intended to receive the block bearing the word "Girl" a picture of a girl may be placed, or the word "Girl" may be placed on the field, the picture of a girl being placed on the block.

Figure 9:
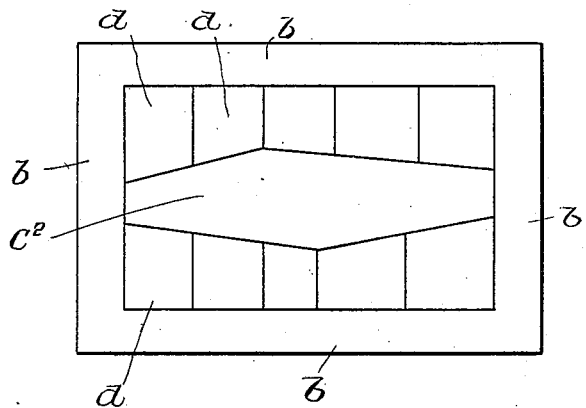

In Fig. 9 I show as an equivalent of the abutment $c$ an elongated fixed strip or abutment $c^2$, located between and separating two block-receiving fields. Said strip is formed to give each field an irregular shape, the blocks $d$ being correspondingly shaped.

Each embodiment of my invention above described has a field of irregular shape bounded by fixed walls. In Figs. 1, 2, 4, 5, and 7 the faces of the abutment $c$ constitute inner walls surrounded by the field. In Figs. 6 and 9 the parts $c'$ and $c^2$ constitute portions of outer walls surrounding the field, there being no inner walls. In Fig. 8 the faces of the part $j$ constitute inner walls, which are the equivalent of the faces of the abutment $c$.

It will be seen that the pictures, characters, &c., constitute means for indicating a particular position for each block, and it will also be seen by reference to the drawings that the irregular shape of the blocks and of the block-receiving field is such that each block when located in accordance with the said indicating means can occupy no other than its predetermined position. In locating each block the user has to consider not only the relation of the symbol on the block to the corresponding fixed symbol, but also the relation of the edges of the blocks to the fixed edges on which they bear and to the edges of the adjacent blocks.

It is obvious that the device may be made two-sided, each side of the supporting-base being provided with a block-field and walls therefor and the blocks being provided with characters on both sides.

My improved appliance consists, essentially, of two general parts—namely, the supporting-base and the parts affixed thereto constituting one part and the series of blocks constituting the other part.

I claim—

1. An educational appliance comprising a field of irregular shape bounded by fixed walls, a plurality of blocks also of irregular shape and formed to collectively cover the field, and means for indicating a particular position for each block, the blocks and field being so formed that each block can occupy only a given position on the field.

2. An educational appliance comprising two general parts, one of which is a field of irregular shape bounded by fixed walls, while the other of said parts is a plurality of blocks also of irregular shape formed to collectively cover the field, one of said parts bearing pictures, characters, or symbols, while the other part bears expressions or embodiments of the said pictures, characters, or symbols, the blocks and field being so formed that each block can occupy only a given position on the field.

3. An educational appliance comprising a fixed abutment, a fixed outer wall surrounding the abutment and separated therefrom by a field of irregular shape, a plurality of blocks also of irregular shape formed to collectively cover the field, and means for indicating the individual positions of the blocks, each block
5 having an inner edge formed to bear on the abutment and an outer edge or edges formed to bear on the outer wall.

In testimony whereof I have affixed my signature in presence of two witnesses.

THOMAS E. THOMPSON.

Witnesses:
C. F. BROWN,
E. BATCHELDER.